US010392532B2

(12) United States Patent
Doe et al.

(10) Patent No.: US 10,392,532 B2
(45) Date of Patent: Aug. 27, 2019

(54) ADHESIVE COMPOSITIONS WITH REPAIR-REWORK ABILITY

(71) Applicant: Illinois Tool Works, Inc., Glenview, IL (US)

(72) Inventors: Daniel K. Doe, Andover, MA (US); Camus Weng, Wujiang (CN); Welkin Li, Wujiang (CN); Peter A. Carbutt, Groton, MA (US); Frank Zhao, Wujiang (CN)

(73) Assignee: Illinois Tool Works, Inc., Glenview, IL (US)

( * ) Notice: Subject to any disclaimer, the term of this patent is extended or adjusted under 35 U.S.C. 154(b) by 304 days.

(21) Appl. No.: 15/270,541

(22) Filed: Sep. 20, 2016

(65) Prior Publication Data

US 2017/0101552 A1 Apr. 13, 2017

Related U.S. Application Data

(60) Provisional application No. 62/238,264, filed on Oct. 7, 2015.

(51) Int. Cl.

| | | |
|---|---|---|
| *C09J 4/06* | (2006.01) | |
| *C09J 11/06* | (2006.01) | |
| *B32B 7/12* | (2006.01) | |
| *B32B 15/20* | (2006.01) | |
| *C08F 4/34* | (2006.01) | |
| *B32B 17/06* | (2006.01) | |
| *B32B 25/14* | (2006.01) | |
| *C09J 5/06* | (2006.01) | |
| *C09J 9/00* | (2006.01) | |
| *C08F 287/00* | (2006.01) | |
| *C08K 5/00* | (2006.01) | |

(52) U.S. Cl.
CPC ............ *C09J 4/06* (2013.01); *B32B 7/12* (2013.01); *B32B 15/20* (2013.01); *B32B 17/061* (2013.01); *B32B 17/063* (2013.01); *B32B 25/14* (2013.01); *C08F 4/34* (2013.01); *C08F 287/00* (2013.01); *C09J 5/06* (2013.01); *C09J 9/00* (2013.01); *C09J 11/06* (2013.01); *B32B 2250/02* (2013.01); *B32B 2255/26* (2013.01); *B32B 2307/51* (2013.01); *B32B 2307/54* (2013.01); *B32B 2457/00* (2013.01); *C08K 5/0091* (2013.01); *C09J 2400/146* (2013.01); *C09J 2453/00* (2013.01); *C09J 2455/006* (2013.01); *C09J 2469/006* (2013.01)

(58) Field of Classification Search
None
See application file for complete search history.

(56) References Cited

U.S. PATENT DOCUMENTS

| | | | |
|---|---|---|---|
| 8,419,890 | B2 | 4/2013 | Jacret |
| 9,133,373 | B2 | 9/2015 | Briggs |
| 2011/0021689 | A1* | 1/2011 | Schellekens ........ C08F 293/005 524/505 |
| 2014/0066539 | A1 | 3/2014 | Tobing et al. |

FOREIGN PATENT DOCUMENTS

| | | |
|---|---|---|
| EP | 0025015 A2 | 3/1981 |
| EP | 0142923 A1 | 5/1985 |
| EP | 1431365 A1 | 6/2004 |
| GB | 2226567 A | 7/1990 |

OTHER PUBLICATIONS

International Search Report dated Dec. 1, 2016 for International Application No. PCT/US2016/055975 filed Oct. 7, 2016.

* cited by examiner

*Primary Examiner* — Sheeba Ahmed
(74) *Attorney, Agent, or Firm* — Avery N. Goldstein; Blue Filament Law PLLC

(57) ABSTRACT

An adhesive composition is provided that includes a block copolymer present at greater than or equal to 30 total weight percent of the adhesive system comprising a high glass transition temperature in subunits Y and Y', each of the subunits Y and Y' having a high glass transition temperature of from 70° C. to 130° C. with a low glass transition temperature subunit Z having a low glass transition temperature of from −100° C. to 10° C. intermediate between said high glass transition temperature acrylate subunits to define a structure Y-Z-Y'. The triblock copolymer is dissolved in a monomer curable under free radical. A free radical initiator of a peroxide or a hydroperoxide are present in combination with a sulfonyl chloride, dihydropyridine and copper or vanadium salt. By heating the cured adhesive at or above 70° C., the adhesive is amenable to being removed, repaired, or reworked.

19 Claims, No Drawings

ADHESIVE COMPOSITIONS WITH REPAIR-REWORK ABILITY

RELATED APPLICATIONS

This application is a non-provisional application that claims priority benefit of U.S. Provisional Application Ser. No. 62/238,264 filed 7 Oct. 2015; the contents of which are hereby incorporated by reference.

FIELD OF THE INVENTION

The present invention in general relates to an adhesive composition and in particular to such compositions with the ability to be repaired or reworked, thereby finding particular utility in electronics assembly.

BACKGROUND OF THE INVENTION

Structural adhesives are well-known for bonding substrate combinations such metal-to-metal, metal-to-plastic and plastic-to-plastic. Structural adhesives have met with considerable success due to the ease of application and even distribution of bonding forces compared to rivets or fusion bonds. Additionally, structural adhesives can form a barrier against external environmental interactions such as water and dust, thereby protecting package contents.

For most of the attractive aspects of structural adhesives as to high temperature performance and good durability, the rigidity of the resulting structural bond creates several problems for certain applications. Common problems associated with bond rigidity including uneven stress, and substrate and component damage upon adhesive removal.

Many of the existing problems of structural adhesives would be overcome if an adhesive existed that either had a rework capability to either remove, repair, reposition or stress temper the, while maintaining the attractive aspects of structural adhesives. Thus, there exists a need for such a structural adhesive in electronics to reduce expensive component repairs, such as the display screen. This invention also allows reuse of expensive ink glass and LCD modules.

SUMMARY OF THE INVENTION

An adhesive composition is provided that includes a block copolymer present at greater than or equal to 35 total weight percent comprising high glass transition temperature subunits Y and Y', each of the subunits Y and Y' having a high glass transition temperature of from 70° C. to 130° C. with a low glass transition temperature subunit Z, having a low glass transition temperature of from −100° C. to 10° C. intermediate between said high glass transition temperature acrylate subunits to define a structure Y-Z-Y'. The block copolymer is dissolved in a monomer solution or matrix, curable under free radical polymerization. A free radical initiator of a peroxide or a hydroperoxide are present in combination with a low molecular weight acid chloride, pyridine and metal complex for fast cure.

A kit is provided that includes the adhesive composition as a two part, storage stable package, together with instructions for use thereof to form an adhesive. A process of bonding a first substrate to a second substrate is also provided that includes the application of the above adhesive composition to first substrate as a bead or line A second substrate is placed in contact with the bead or line and the composition is allowed to cure. By heating the cured adhesive to 70° C. and above, the adhesive is amenable to being removed, repaired, or reworked.

DETAILED DESCRIPTION OF THE PREFERRED EMBODIMENTS

A re-workable elastomeric fast-curing from 1-10 minutes adhesive is provided with ability to cure in thin bond-lines and thick bond-lines having thicknesses ranging from 0.075 millimeters (mm) to more than 10 mm. The present invention has applications in a variety of settings where it is desirous to have structural performance with rework or repair ability and thus not structurally permanent illustratively includes electronics such as touch panel displays, lap tops, computer and display monitors, cell phone, GPS, electronic watch, and electronic appliance touch panel screens.

In some inventive embodiments, an adhesive is provided that cures in a time of from 1 to 10 minutes for fast-curing and has ability to up to 30 minutes and is also characterized by QUV color stability, clarity and weather resistance. While most conventional structural adhesives achieve permanent adhesion or cohesive failure, which is dominated by solution elastomers with high tensile and high tear or cohesiveness. The present invention uses high solution blends with the tensile of the elastomers >8 MPa, with optional use of blends with high tensile grades for gap-filling uses to offer higher toughness in elastic strain. As a result of these attributes, in some inventive embodiments, an adhesive is provided that does can be used in bonding assembly for applications that illustratively include smart or cell phone, GPS, laptop cases and housings, as well as HVAC units and industrial and consumer other items needing the option of post-bonding repairability or reworking.

It is to be understood that in instances where a range of values are provided, for example with respect to a weight percentage range of a composition component, that the range is intended to encompass not only the end point values of the range but also intermediate values of the range as explicitly being included within the range and varying by the last significant figure of the numeral. By way of example, a recited range of from 1 to 4 is intended to include 1-2, 1-3, 2-4, 3-4, and 1-4.

An adhesive composition has the attributes of adhesion to a variety of substrates, can be formed to cure to an optically clear bond, and re-workable and repair ability based on clean removal from substrates at or above 70° C., as well as passing a three day test of high humidity aging, with >90% bond retention to various substrates. The inventive adhesive composition includes a linear block copolymer present at greater than or equal to 35 total weight percent having the structure Y-Z-Y' where high glass transition temperature subunits Y and Y', each have a high glass transition temperature of from 70° C. to 130° C. and subunit Z has a low glass transition temperature (Tg) of from −100° C. to +10° C. The linear triblock copolymer is dissolved in a monomer curable under free radical conditions and confirmed by cured physical properties as a polymer solution and not a suspension. In the presence of a free radical initiator of a peroxide or a hydroperoxide; and an acid chloride having a molecular weight of less than 1000 Daltons, pyridine and metal complex, the adhesive composition cures to an adhesive with the above attributes and modified within these attributes by adjustment of amounts of these components in ways conventional to the art.

The triblock copolymer having the structure Y-Z-Y is formed such that both Y and Y' have identical chemical structures, or vary there between as to chain length, chemical structure, of both chain length and chemical structure. In certain inventive embodiments, the copolymer has acrylic terminal functionality for compatibility and adhesion. It is further appreciated that additional end block subunits are present, intermediate subunits are present, or both end block subunits and intermediate subunits with the proviso that such additional subunits are limited to >20 to <70 percent of the number average molecular weight of the block copolymer. In some inventive embodiments, the triblock copolymer is a linear block copolymer. In certain inventive embodiments, a radial triblock copolymer is used to improve heat resistance relative to linear triblock copolymers.

Subunits Y and Y' are each predominantly composed of one or more monomers of a methyl methacrylate, ethyl methacrylate, a vinyl aromatic, a cyclohexyl methacrylate, isobornyl methacrylate, or mixtures thereof such as Y-Z-X, so long as each subunit of Y and Y' has a subunit glass transition temperature of from 70° C. to 130° C. X being a monomer listed above. A vinyl aromatic operative herein in a subunit Y or Y' illustratively includes styrene, α-methylstyrene, and p-methylstyrene, vinyl toluene, and mixtures thereof. In some inventive embodiments, the monomer is present to form a homopolymer having a measured glass transition temperature of from 70° C. to 130° C., with the homopolymer being polystyrene or poly(methyl methacrylate).

In some inventive embodiments, the methacrylate portion of a monomer illustratively includes esters of α,β-ethylenically unsaturated carboxylic acids with $C_1$-$C_{20}$ alkanols, or $C_3$-$C_8$ dicarboxylic acids with $C_1$-$C_{20}$ alkanols having 1 to 12 carbon atoms. Still further, methacrylates operative in subunits Y or Y' illustratively include methyl acrylate, ethyl methacrylate, butyl methacrylate, isobutyl methacrylate, n-hexyl methacrylate, 2-ethylhexyl methacrylate, n-heptyl methacrylate, ethylpentyl methacrylate, 2-methylheptyl methacrylate, octyl methacrylate, isooctyl methacrylate, n-nonyl methacrylate, isononyl methacrylate, n-decyl methacrylate, isodecyl methacrylate, dodecyl methacrylate, lauryl methacrylate, tridecyl methacrylate, stearyl methacrylate, glycidyl methacrylate, alkyl crotonates, vinyl acetate, di-n-butyl maleate, di-octylmaleate, acetoacetoxyethyl methacrylate, acetoacetoxypropyl methacrylate, hydroxyethyl methacrylate, allyl methacrylate, tetrahydrofurfuryl methacrylate, cyclohexyl methacrylate, 2-ethoxyethyl methacrylate, 2-methoxy methacrylate, 2-(2-ethoxyethoxy)ethyl methacrylate, 2-ethylhexyl methacrylate, 2-propylheptyl methacrylate, 2-phenoxyethyl methacrylate, isobornyl methacrylate, caprolactone methacrylate, polypropyleneglycol monomethacrylate, polyethyleneglycol methacrylate, benzyl methacrylate, 2,3-di(acetoacetoxy)propyl methacrylate, hydroxypropyl methacrylate, methylpolyglycol methacrylate, 3,4-epoxycyclohexylmethyl methacrylate, 1,6 hexanediol dimethacrylate, 1,4 butanediol dimethacrylate and mixtures thereof. It is appreciated that through addition of monomers that are predominant in subunit Z, that the glass transition temperature of a subunit Y or Y' is reduced to yield glass transition points or more.

The Z subunit of the linear block copolymer is formed predominantly from monomers of methacrylate having a $C_4$-$C_9$ alkyl sidechain, a vinyl monomer, a macromonomer, or mixtures thereof to produce a Z subunit glass transition temperature of from −60° C. to 10° C. and in other embodiments of the present invention of from −100° C. to 10° C. Monomers from which subunit Z is formed illustratively include n-butyl methacrylate, n-pentyl methacrylate, n-hexyl methacrylate, n-heptyl methacrylate, n-octyl methacrylate, n-nonyl methacrylate; branched isomers thereof, such as 2-ethylhexyl acrylate and isooctyl acrylate; and cyclic monomers such as cyclohexyl acrylate, norbornyl acrylate, and isonorbornyl acrylate. Vinyl monomers operative herein illustratively include vinyl esters, vinyl ethers, vinyl halides, vinylidene halides, and also cyclovinyl compounds and heterocyclic vinyl compounds in which the heteroatom is N, O, or S. Specific vinyl monomers operative herein illustratively include vinyl acetate, vinylformamide, vinylpyridine, ethyl vinyl ether, 2-ethylhexyl vinyl ether, butyl vinyl ether, vinyl chloride, vinylidene chloride, acrylonitrile, and mixtures thereof.

Z subunit macromonomers operative herein illustratively include polymerized monomers that retain polymerizable moieties sufficient to join at subunits Y and Y' thereto. In instances where the polymerizable moieties are terminal, a linear copolymer results. Moieties suitable for bonding to subunits Y and Y' include methacrylic, acrylic, or vinyl aromatic moieties. In some inventive embodiments, the macromonomer includes a polyisoprene, polybutylacrylate, polyethylenebutylene or polysiloxane. Still other optional co-monomers could include styrene such as SIBS. Further optional co-monomers from which subunit Z is produced include N-methylolacrylamide, methacrylic acid, allyl alcohol, maleic anhydride, itaconic anhydride, itaconic acid, benzoin acrylate, acrylated benzophenone, acrylamide, glycidyl methacrylate, and mixtures thereof. Also, as detailed above with respect to subunits Y or Y', subunit Z in some inventive embodiments illustratively includes esters of α,β-ethylenically unsaturated carboxylic acids with $C_1$-$C_{20}$ alkanols, or $C_3$-$C_8$ dicarboxylic acids with $C_1$-$C_{20}$ alkanols having 1 to 12 carbon atoms. Included are acid grafting, such as acrylic acid, methacrylic acid, maleic acid or vinyl phosphate grafting. It is appreciated that through addition of monomers that are predominant in subunit Y, that the glass transition temperature of subunit Z' is reduced by 60° C. from Y and Y', or preferably by more than 120° C.

Exemplary specific inventive linear triblock copolymers have the structure poly(methyl methacrylate)-poly(butyl acrylate)-poly(methyl methacrylate) with number average molecular weight of less than 120,000 Daltons, outer block Y or Y' subunit glass transition temperature values of from 85° C. to 120° C., and a central Z subunit glass transition temperature of from −40° C. to −50° C.; polystyrene-polyisoprene-polystyrene with a number average molecular weight of less than 100,000 Daltons. Block copolymers operative in the present invention are commercially available from a variety of vendors.

The amount of block copolymer present in an adhesive composition is greater than 30 total weight percent up to a 60 percent, limited by factors including solubility in the monomer system. The presence of other substances such as free radical generators, adhesion promoters, and other optional additives, overall viscosity of the uncured adhesive composition is medium-low viscosity, or less than 60,000 cps. for ease of use in high volume rapid fixturing assembly. Typical loadings of block copolymer range from 30 to 60 total weight percent. With respect to acrylic poly methyl methacrylate-polybutyl acrylate-poly methyl methacrylate block copolymers, loadings of greater than 35 total weight percent are present, while 30-50 total weight percent of high styrene based polystyrene-polyisoprene-polystyrene triblock copolymers are generally present to achieve high elongation (greater than 400%) combined with high tear strength (greater than 250 lb./linear inch [ASTM D-624

Standard Test Method for Tear Strength of Conventional Vulcanized Rubber and Thermoplastic Elastomers, Die C method]).

Typically, the free radical initiator or multiple initiators, is present from 0.1 to 3% by weight, with 0.5-2% preferred. The monomer in which the triblock copolymer is dissolved is selected to be free-radical polymerizable and in some embodiments, particularly well-suited for the bonding of glass and plastic windows in electronic devices, and which are transparent upon curing. Monomers operative herein include methyl methacrylate (MMA), tetrahydrofurfuryl methacrylate (THFMA), Octyl decyl acrylate (ODA), isodecyl acrylate (IDA), lauryl methacrylate (LMA), isobornyl acrylate (IBOA), tetrahydrofurfuryl acrylate (THFA), ethyl methacrylate, 2-ethylhexyl methacrylate, cyclohexyl methacrylate, $\alpha,\beta$-ethylenically unsaturated carboxylic acids with $C_1$-$C_{10}$ alkyl esters such as methyl acrylate, ethyl acrylate, butyl acrylate and 2-ethylhexyl acrylate, acrylonitrile, methacrylonitrile, styrene, vinyl toluene, $\alpha,\beta$-ethylenically unsaturated polycarboxylic acids with $C_1$-$C_8$ alkanols such as acrylic acid (AA)\, methacrylic acid (MAA), isophthalic acid (IPA), crotonic acid, maleic acid and fumaric acid; vinyl phosphates, such as HEMA phosphate mono- and di-ester, and mixtures thereof. It is also appreciated that the multi-functional monomers that are di-, tri- and tetra-functional are present to create a controlled degree of cross-linking. Multi-functional monomers operative herein illustratively include trimethylol propane trimethacrylates and triacrylates, pentaeurythritol triacrylates, trimethylol propone ethoxylated/propoxylated tria(meth)acrylates tetraallylethane, glycerol trimethacrylate and ethoxylated/propoxylated tri(meth)acrylates, and combinations thereof. It is appreciated that cross-linking through inclusion of multi-functional monomers is a well-established technique for improved elongation/total strain energy relative to a non-crosslinked version.

In order to cure the monomer, a free radical initiator of a peroxide or a hydroperoxide is present. Typically, the free radical initiator of a peroxide or a hydroperoxide is present from 0.1 to 3 total weight percent, or blends thereof. Peroxide, peresters, and hydroperoxide operatively herein illustratively include t-butyl perbenzoate, t-butyl peracetate, and hydroperoxides such as cumene hydroperoxide and/or t-butyl/t-amyl hydroperoxide, and combinations thereof are preferred.

A co-agent initiator of a low molecular weight acid chloride or diacid chloride with pyridine and metal complex catalyst is also provided. Typically, the acid chloride is preferably a low MW aromatic sulfonyl chloride. The pyridine is present from 0.05 to 1 total weight percent on adhesive system. Acid chlorides operative herein illustratively include tosyl chloride, methoxy benzene sulfonyl chloride, bis-4,4'-diphenyl sulfonyl chloride ether are preferred, and combinations thereof. Optionally ionic crosslinking monomers such as zinc diacrylate and zinc dimethacrylate can be used to improve hot strength, chemical/corrosion resistance and fixturing, as well improve cohesive failure. In some inventive embodiments, a sulfonyl chloride is also provided in the adhesive composition. Typically, the sulfonyl chloride is present 0.1 to 1.0 total weight percent. Sulfonyl chlorides operative herein illustratively include toluene sulfonyl chloride, p-methoxy benzene sulfonyl chloride, 4,4'-Oxybis (Benzene Sulphonyl Chloride), and other iterations and combinations thereof.

In some inventive embodiments, an adhesion promoter package is also provided in the adhesive composition. Typically, the adhesion promoter is present 0.1 to 10.0 total weight percent. Adhesion promoters operative herein illustratively include phosphate ester methacrylate, unsaturated carboxylic acids like methacrylic acid, and silanes such as glycidyl trimethoxy or triethoxy silane, methacryloxy trimethoxy/triethoxy silane, vinyl trimethoxy/triethoxy silane and combinations thereof for the benefit of improved heat resistance and bond durability.

In some inventive embodiments, one or more additives are provided to enhance the performance of the resulting adhesive or storage properties of the adhesive composition. Such additive(s) can function as cure inhibitors, open-time promoters, thixotropic agents, antioxidants, plasticizers, dyes, pigments and reinforcing agents.

The inhibitor increases the shelf life of the adhesive composition. Typically, the inhibitor, if present, is present from 0.1 to 1 total weight percent. Inhibitors operative herein illustratively include benzoquinones, naphthoquinone (NQ), butyl hydroxytoluene (BHT), hydroquinone (HQ), p-methoxy hydroquinone (MEHQ) and combinations thereof.

An open time promoter increases the length of the time the adhesive remains skin free. Typically, the open time promoter, if present, is present 0.01 to 0.5 total weight percent. Open time promoter operative herein illustratively include paraffin waxes, isoparaffin waxes, and combinations thereof. High boiling point monomers such as octyl- and decyl-methacrylate can also help promote open times, and inclusive of $C_8$- to $C_{18}$-alkyl acrylates and methacrylates.

A thixotropic agent may be utilized to increase the viscosity of the monomer component and thus prevent the adhesive composition from dripping or sagging in vertical applications prior to cure. Typically, the thixotrope, if present, is present 1 to 10 total weight percent. Thixotropic agents operative herein illustratively include polyamide thixotropes, fumed silica, treated fumed silica and combinations thereof.

An antioxidant if present, is present 0.1 to 1.5 total weight percent. Antioxidants operative herein illustratively include 2,6-ditert-butyl-p-cresol, BHT, HQ, MEHQ, benzoquinone, and combinations thereof.

A polymeric plasticizer may be utilized to decrease the viscosity of the monomer component. Typically, the plasticizer, if present, is present 1 to 5 total weight percent. Polymeric plasticizers operative herein illustratively include polyester and acrylic plasticizers and combinations thereof. Most preferred are polymeric acrylic plasticizers for their compatibility.

In some inventive embodiments, a cohesive failure mode promoter can provide highly elastic and toughened bonded assemblies and embodied within this invention. In another inventive embodiment, the adhesive fails via elastically toughened adhesive failure, the adhesive remains adhered remains bonded to both substrates. Typically, the cohesive failure mode promoter, if present, is present 0.5 to 10 total weight percent. Cohesive failure mode promoter operative herein illustratively include rosin esters, such as tall oils, gum rosin, talc, paraffin waxes, and combinations thereof.

An inventive adhesive composition is readily stored as a two part adhesive with a Part A containing low MW tosyl chloride, cumene hydroperoxide and/or t-butyl perbenzoate and a Part B containing initiator promoter dihydropyridine and metal accelerator, such as copper acetyl acetonate or as a novel dye copper phthalocyanine, also called Blue Dye 9S4. It is appreciated that the weight ratio of Part A:Part B is readily varied for ease of use. Exemplary weight ratios range from 20:1 to 1:1. As separate parts, an inventive adhesive composition typically shows greater than 5 days stability at greater than 62° C.; indicating a commercially acceptable shelf life and adhesive consistency for both viscosity and reactivity. It is appreciated that in some inventive embodiments the fully formulated adhesive composition has a viscosity of less than 50,000 centipoise. As a result of viscosity control, an invention adhesive composition is amenable to delivery as a bead or line through a dispensing needle, such as an 18-25-gauge diameter needle, thereby making the inventive adhesive well-suited to bonding assembly of electronic components and display panels.

Upon cure of an adhesive composition, an adhesive is produced with elastomeric properties up to 100 and up to 500% elongation. Highly elastomeric materials are more elastic in thin film of 2-3 mm and can achieve higher than normal tensile and elongation under ASTM D638 requiring a minimum cured thickness of 0.060 inch. High toughness results in elastic-plastic strain toughening and dissipates energy reducing failure to bonded components as well dampens impact and vibrational energy that can damage electronic components. High tear and tensile strength within this invention offers such. Another key aspect is bond consistency and durability to humid environments up to 65° C. The resulting adhesive is able to bond to a variety of substrates, such as magnesium-aluminum alloys, a polyamide-6,6, a polyamide alloy, a polyamide-4,10 alloy, aluminum, polycarbonate (PC), Acrylonitrile-Butadiene-Styrene (ABS), PC-ABS alloys, PC-styrene-acrylonitrile alloys, ink coated glass, and polyethylene terephthalate, polybutylene terephthalate laminated or coated ink-glass. Re-workable and repair ability is based on highly clean removal of the cured adhesive system from adherent substrates above 70° C. and typically from 70° C. to 100° C., as well pass a three day 85-95% humidity aging test, with more than 90% bond retention to substrates of aluminum, PC, ABS, PC-ABS alloys, and ink coated glass.

It has been surprisingly observed that the inclusion of a low molecular weight 300 to 1000 Daltons, and inclusive of disulfonyl chlorides, which low MW mono- and disulfonyl chlorides promote rapid curing, thermal stability, adhesiveness and durability, along with ability to remove the adhesive from such substrates upon heating to 70° C., as well bond difficult to adhere substrates used in electronics. A preferred MW for mono- and disulfonyl chlorides is <500 Daltons.

The formulary of an inventive adhesive composition is summarized below in Table 1.

TABLE 1

Summary of Unfilled Inventive Adhesive Composition

| Component | Typical Amount Total Wt. Percent | Pref. Amount - Total Wt. Percent |
|---|---|---|
| Triblock copolymer | 30-80 | 35-60 |
| Monomer | 40-80 | 40-60 |
| free radical initiator(s) | 0.1-2 | 0.5-1.5 |
| Low MW Sulfonyl chloride | 0.1-1 | 0.1-0.4 |
| Dihydropyridine | 0.5-3 | 0.2-1 |
| Antioxidant | 0.25-1.5 | 0.5-1 |
| CuAcAc or Blue Dye 9S4 | 0.1-5 ppm | 1-2 ppm |
| Optional components | | |
| Multi-functional monomer | 0-10 | 2-6 |
| Sulfonyl chloride (f = 1-2) | 0-1 | 0.05-0.4 |
| Dihydropyridine | | |
| Secondary initiator | 0.5-3 | 0.5-1.5 |
| Cure inhibitors | 0-1.5 | 0.5-1 |
| Open-time promoters | 0-10 | 2-6 |

TABLE 1-continued

Summary of Unfilled Inventive Adhesive Composition

| | Typical Amount Total Wt. Percent | Pref. Amount - Total Wt. Percent |
|---|---|---|
| Thixotropic agents | 0-10 | 3-6 |
| Other antioxidants | 0-1.5 | 0.1-0.5 |
| plasticizers | 0-10 | 0-3 |
| Cohesive failure mode promoters | 0-15 | 1-5 |
| Dyes or pigments | 0-0.5 | 0.1-0.3 |

EXAMPLES

The present invention is further detailed with respect to the following non-limiting examples. These examples are intended to be illustrative of particular formulations and properties of the inventive adhesive, and not intended to limit the scope of the appended claims.

Example 1. Formulating and Mixing Procedure of Inventive Composition

A fast-curing reactive composition is composed of two parts, Part A and Part B, which are prepared according to the composition set forth shown in the table as below:

To ensure the uniform dispersion, elastomers are pre-dissolved in monomers following by the mixing with all the other ingredients, and homogenizing with speed mixer at a gradient increase of rotation speed under room temperature.

The curing process is kicked off by blending of the two parts. Herewith, the blending ratio of Part A to Part B is set at about 10 to 1, which can be adjusted flexibly according to the application requirements. The complete curing normally happens within 60 minutes at room temperature, and this can also be shortened with the increase in temperature up to 90° C. The compositions of the first and second parts of the formulations are set forth below in Table 1.

TABLE 1

Formulating and Mixing Procedure

| Component | Typical amount Total weight percentage |
|---|---|
| PART 1 | |
| Monomer | 35.0-60.0 |
| Copolymer | 35.0-60.0 |
| Antioxidant | 0.5-1.0 |
| Inhibitor | 0-1.5 |
| Initiator | 0.1-2.0 |
| Low MW sulfonyl chloride | 0.1-1.0 |
| PART 2 | |
| Monomer | 35-60 |
| Copolymer | 35.0-60.0 |
| Antioxidant | 0.5-1.0 |
| Inhibitor | 0-1.5 |
| Catalyst | 0.1-5 ppm |
| Pigment | 0.1-0.2 |
| Dihydropyridine | 0.5-30 |

Example 2. Comparison with Conventional Products

Five different two-part formulations are prepared and tested for cure speed, adhesion performance. The first formulation and second formulation are control formulations, including methyl methacrylate and a styrene-butadiene-styrene triblock copolymer/styrene-isoprene-styrene Triblock copolymer. The third to the fifth formulation are in accordance with the present invention, including methyl methacrylate and a polymer with the structural poly(acrylate)-poly(butyl acrylate)-poly(acrylate). The compositions of the first and second parts of the formulations are set forth below in Table 2.

TABLE 2

Comparative two-parts curable composition

| RM Name | Formula 1 (%) (Control 1) | Formula 2 (%) (Control 2) | Formula 3 (%) (Inventive) | Formula 4 (%) (Inventive) | Formula 5 (%) (Inventive) |
|---|---|---|---|---|---|
| Part A | | | | | |
| MMA, inhibited | 40.76 | 40.76 | 26.16 | 26.16 | 32.00 |
| THFMA | 7.90 | 7.90 | 7.88 | 7.88 | |
| poly(acrylate)-poly(butyl acrylate)-poly(acrylate) | | | 48.87 | 48.87 | 48.00 |
| styrene-butadiene-styrene Triblock copolymer | 34.19 | | | | |
| styrene-isoprene-styrene Triblock copolymer | | 34.19 | | | |
| ODA/IDA | 4.62 | 4.62 | 4.60 | 5.10 | 7.00 |
| Methacrylic Acid | 4.21 | 4.21 | 4.20 | 4.20 | 4.20 |
| PL-2349 | | | | 0.50 | |
| pentaerythritol triacrylate | 4.01 | 4.01 | 4.00 | 4.00 | 4.00 |
| hemaphosphate monoester | 1.51 | 1.51 | 1.50 | 1.00 | 1.50 |
| BHT | 1.00 | 1.00 | 1.00 | 1.00 | 1.00 |
| PTSC | 0.10 | 0.10 | 0.10 | 0.10 | 0.10 |
| HQ | 0.60 | 0.60 | 0.60 | 0.60 | 0.60 |
| t-butyl perbenzoate, 98% | 0.50 | 0.50 | 0.50 | 0.60 | 0.50 |
| Cumene hydroperoxide 87% | 0.60 | 0.60 | 0.60 | | 0.60 |
| Part B | | | | | |
| MMA, inhibited | 53.76 | 53.76 | 43.90 | 40.88 | 43.90 |
| poly(acrylate)-poly(butyl acrylate)-poly(acrylate) | | | 51.00 | 54.00 | 51.00 |
| styrene-butadiene-styrene Triblock copolymer | 40.00 | | | | |
| styrene-isoprene-styrene Triblock copolymer | | 40.00 | | | |
| BHT | 1.22 | 1.22 | 1.00 | 1.00 | 1.00 |
| 3,5-diethyl-1,2-dihydro-1-phenyl-2-propylpyridine | 4.90 | 4.90 | 4.00 | 4.00 | 4.00 |
| Copper pthalocyanine blue dye | 0.12 | 0.12 | 0.10 | 0.02 | 0.10 |
| CuAcAc 0.02% in MMA | | | | 0.10 | |

Each of the two-part formulations was prepared by mixing the components listed in the above tables. Part A and Part B for each formulation were combined and allowed to cure under various conditions (i.e., room temperature, high temperature). The compositions were then tested for cure speed, impact strength, and adhesion performance on various plastics and metal substrates. The results are set forth in Tables 3-4 below.

TABLE 3

Performance results of comparative two-parts curable compositions

| Viscosity | Formula 1 (%) (Control 1) | Formula 2 (%) (Control 2) | Formula 3 (%) (Inventive) | Formula 4 (%) (Inventive) | Formula 5 (%) (Inventive) |
|---|---|---|---|---|---|
| Part A | 100000 | 13500 | 15000 | — | 11500 |
| Part B | 40000 | 2000 | 35000 | 35000 | 35000 |
| Peak exothermal time | 16 | 11 | 6 | 6 | 6 |
| Fixture time | >10 | >9 | 4-6 | 4-6 | 4-6 |

TABLE 4

Tensile properties of comparative two-part curable compositions

| Shear strength (Al6061) | Formula 1 (%) (Control 1) | Formula 2 (%) (Control 2) | Formula 3 (%) (Inventive) | Formula 4 (%) (Inventive) | Formula 5 (%) (Inventive) |
| --- | --- | --- | --- | --- | --- |
| Al6061: Al6061 | 9.2 | 11.0 | 14.5 | 17.1 | 12.0 |
| ABS:ABS | 2.2 | 2.3 | 4.5 | 4.7 | 4.3 |
| PC:PC | 3.3 | 4.1 | 3.8 | 3.6 | 3.3 |
| Tensile Strength | 10 | — | 12 | — | — |
| Elongation at break | 246 | — | 160 | — | — |

As can be seen, the inventive compositions (formulation 3-5), containing the copolymer with the structural poly(acrylate)-poly(butyl acrylate)-poly(acrylate), provide faster fixture with an appropriate open time for many manufacturer assembly parts. The inventive compositions had a peak exothermic time that is earlier than the control formulations. Such curing properties are more suitable from a manufacturing standpoint, in that the time it takes the inventive formulations to cure is quick enough to sufficiently support the materials to which it is bonded.

In addition, the inventive compositions are found to provide improved results in each and every tensile property tested, as compared to the control formulations. The inventive compositions exhibited improved shear strength on Aluminum Alloy, PC, and ABS.

Upon heating the substrates (ink glass and alloy of PC & ABS) which are bonded with the five formulations in Example 2 up to 80° C., peel the alloy off slowly. The failure of the specimen with formulation 3-5 were adhesion failure, in which the adhesive remained on the alloy side, showing its re-workability obviously in comparison with formulation 1-2, which showed cohesion failure.

Example 3. Repair

Should structural or permanent bond strengths be used it would destroy one or both of the bonding substrates. To prevent this the invention shows use of an optically clear and weather resistant elastomer highly compatible to acrylic monomers for reduced monomer shrinkage providing high cohesiveness and elasticity as the key property with repair above 70+° C. Use of highly soluble solution elastomer allows superior elasticity and tear/cohesiveness without being rigid in bulk modulus and ultimate strength, so that is stronger than any component (>1800-2000 psi strength) and deemed structural adhesive.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. An adhesive composition comprising:
    a linear triblock copolymer present at greater than or equal to 30 total weight percent comprising high glass transition temperature subunits Y and Y', each of the subunits Y and Y' having a high glass transition temperature of from 70° C. to 130° C. with a low glass transition temperature subunit Z having a low glass transition temperature of from −100° C. to 10° C. intermediate between said high glass transition temperature acrylate subunits to define a structure Y—Z-Y';
    a monomer curable under free radical conditions in which said linear triblock copolymer is dissolved in monomers and cross-linkers;
    a blend of at least one of a free radical initiator of a peroxide or a hydroperoxide, and a perester;
    an acid chloride or a diacid chloride with pyridine; and antioxidant inhibitor(s).

2. The adhesive composition of claim 1 wherein said linear triblock copolymer has the structure poly(acrylate)-poly(butyl acrylate)-poly(acrylate), whereby the acrylate in methyl methacrylate.

3. The adhesive composition of claim 1 where said linear triblock copolymer has the structure poly(acrylate)-poly(siloxane)-poly(acrylate).

4. The adhesive composition of claim 1 wherein said linear triblock copolymer has the structure styrene-isoprene-styrene and a number average molecular weight of less than 100,000 Daltons.

5. The adhesive composition of claim 1 wherein said subunits Y and Y' have identical chain length.

6. The adhesive composition of claim 1 wherein said subunits Y and Y' have identical chemical structure.

7. The adhesive of composition of claim 1 wherein said subunits Y and Y' comprise one or more monomers of a methyl methacrylate, a vinyl aromatic, a cyclohexyl methacrylate, isobornyl methacrylate, or mixtures thereof.

8. The adhesive of composition of claim 7 wherein said vinyl aromatic is one or more of styrene, α-methylstyrene, p-methylstyrene, vinyl toluene, p-methoxy styrene or mixtures thereof.

9. The adhesive of composition of claim 2 wherein said linear triblock copolymer is an acrylate in each instance is one of acrylate, methacrylate, diacrylate, dimethacrylate, triacrylate, trimethacrylate or tetra acrylate.

10. The adhesive composition of claim 1 wherein said subunit Z comprises one or more Z monomers of a acrylate or methacrylate having a $C_4$-$C_9$ alkyl sidechain, a vinyl monomer, a macro monomer, or mixtures thereof.

11. The adhesive composition of claim 10 wherein said Z monomers is one or more of n-butyl methacrylate, n-pentyl methacrylate, n-hexyl methacrylate, n-heptyl methacrylate, n-octyl methacrylate, n-nonyl methacrylate; n-butyl acrylate, 2-ethylhexyl acrylate isooctyl acrylate, cyclohexyl acrylate, norbornyl acrylate, isonorbornyl acrylate, vinyl acetate, vinylformamide, vinylpyridine, ethyl vinyl ether, 2-ethylhexyl vinyl ether, butyl vinyl ether, acrylonitrile, and vinyl siloxane.

12. The adhesive composition of claim 1 wherein said monomer is at least one of methacrylate or a acrylate and;
wherein the methacrylate and acrylate further comprise: tetrahydrofurfuryl methacrylate (THFMA), Octyl decyl acrylate (ODA), iso-decyl acrylate (IDA), decyl methacrylate, decyl acrylate, lauryl methacrylate (LMA), isobornyl acrylate (IBOA), and tetrahydrofurfuryl acrylate (THFA).

13. The adhesive composition of claim 1 wherein said linear triblock copolymer, said monomer, said free radical initiator, and said acid chloride or said diacid chloride with pyridine collectively have a viscosity of less than 60,000 centipoise.

14. The adhesive composition of claim 1 further comprising a sulfonyl chloride functional or difunctional ingredient.

15. The adhesive composition of claim 1 comprising of copper complexed dye or pigment.

16. An article comprising:
a first substrate of one of optically clear glass, ink glass, or laminated glass;
a second substrate of one of aluminum, PC-ABS alloy, or magnesium-aluminum alloy; and
an adhesive bonding the first substrate and the second substrate and formed by the cure of the adhesive composition of claim 1.

17. A process of bonding a first substrate to a second substrate comprising:
applying an adhesive composition of claim 1 to first substrate as a bead or line; and
placing a second substrate into contact with the bead or line; and allowing sufficient time for the bead or line to cure to bond the first substrate to the second substrate.

18. The process of claim 17 wherein the adhesive composition is optically transparent and further comprising heating the bead or line to a temperature of greater than 70° C., and then repositioning one of the first substrate or the second substrate with adhesive reapplication after removal of the cured adhesive bead.

19. The process of claim 17 wherein at least one of the first substrate or the second substrate is magnesium-aluminum alloys, polyamide-6,6, a polyamide alloy, a polyamide-4,10 alloy, 10-50% glass filled polyamides, aluminum, polycarbonate (PC), Acrylonitrile-Butadiene-Styrene (ABS), PC-ABS alloys, PC-styrene-acrylonitrile alloys, ink coated glass, and polyethylene terephthalate or coated ink-glass.

* * * * *